United States Patent [19]
Diaz-Barrios et al.

[11] Patent Number: 5,767,034
[45] Date of Patent: Jun. 16, 1998

[54] OLEFIN POLYMERIZATION CATALYST WITH ADDITIVE COMPRISING ALUMINUM-SILICON COMPOSITION, CALIXARENE DERIVATIVES OR CYCLODEXTRIN DERIVATIVES

[75] Inventors: Antonio Diaz-Barrios, San Antonio; Jose Liscano, Los Teques; Marianela Trujillo; Giuseppe Agrifoglio, both of Caracas; Jose Orlando Matos, Los Teques, all of Venezuela

[73] Assignee: Intevep, S.A., Caracas, Venezuela

[21] Appl. No.: 656,028

[22] Filed: May 31, 1996

[51] Int. Cl.$^6$ .............. B01J 31/00; B01J 37/00; C08F 4/02; C08F 4/60
[52] U.S. Cl. .............. 502/132; 502/118; 502/129; 502/125; 502/126; 502/103
[58] Field of Search .............. 502/104, 108, 502/118, 129, 132

[56] References Cited

U.S. PATENT DOCUMENTS

| | | | |
|---|---|---|---|
| 396,932 | 7/1889 | Gloriod et al. | 502/103 |
| 3,629,216 | 12/1971 | Iwasaki et al. | 502/117 |
| 3,661,878 | 5/1972 | Aishima et al. | 502/132 |
| 3,987,233 | 10/1976 | Sato et al. | 502/129 |
| 4,027,089 | 5/1977 | Aishima et al. | 502/116 |
| 4,036,867 | 7/1977 | Piekarski et al. | 502/103 |
| 4,069,169 | 1/1978 | Toyoda et al. | 252/441 |
| 4,290,915 | 9/1981 | Toyota et al. | 526/125 |
| 4,315,088 | 2/1982 | Kitagawa et al. | 502/132 |
| 4,324,877 | 4/1982 | Ueno et al. | 502/132 |
| 5,075,270 | 12/1991 | Brun et al. | 502/117 |
| 5,137,995 | 8/1992 | Yokoyama et al. | 502/125 |
| 5,192,732 | 3/1993 | Duranel et al. | 502/126 |
| 5,212,133 | 5/1993 | Duranel et al. | 502/125 |
| 5,238,891 | 8/1993 | Miro | 502/113 |
| 5,354,721 | 10/1994 | Geerts | 502/117 |
| 5,411,925 | 5/1995 | Geerts et al. | 502/117 |
| 5,414,180 | 5/1995 | Geerts et al. | 502/117 |
| 5,439,662 | 8/1995 | Spitz et al. | 502/107 |
| 5,455,018 | 10/1995 | Brun et al. | 502/134 |
| 5,484,754 | 1/1996 | Spitz et al. | 502/117 |

OTHER PUBLICATIONS

Scata' et al., US Reissue 31,099 of USP 4,115,319, issued Sep. 1978, Dec. 1982.

*Primary Examiner*—Glenn Caldarola
*Assistant Examiner*—J. Pastwozyk
*Attorney, Agent, or Firm*—Bachman & LaPointe, P.C.

[57] ABSTRACT

An olefin polymerization catalyst includes a halogen-containing magnesium compound; a titanium compound; and an additive selected from the group consisting of (a) a mixture of an aluminum alkoxide compound and polydimethylsiloxane, (b) an aluminosiloxane, (c) the reaction product of an aluminum alkyl and a calixarene, (d) the reaction product of an aluminum alkyl and a cyclodextrin, and mixtures of (a)–(d).

17 Claims, 3 Drawing Sheets x=6, α-cyclodextrin
x=7, β-cyclodextrin
x=8, γ-cyclodextrin y=1, 4-tert-butylcalix[4]arene
y=3, 4-tert-butylcalix[6]arene
y=5, 4-tert-butylcalix[8]arene

OLEFIN POLYMERIZATION CATALYST WITH ADDITIVE COMPRISING ALUMINUM-SILICON COMPOSITION, CALIXARENE DERIVATIVES OR CYCLODEXTRIN DERIVATIVES

BACKGROUND OF THE INVENTION

The invention relates to a polymerization catalyst, particularly to a polymerization catalyst for the polymerization of olefins.

Numerous processes are known in the art for polymerization of olefins such as ethylene into polyolefins such as polyethylene.

Parameters of concern during the polymerization of olefins include the yield of polyolefin, the melt flow index (MFI) of the polyolefin product, the bulk density of the polyolefin product, and the content of fines in the resulting polyolefin product. Numerous catalysts and processes are known in the art for polymerizing olefins so as to obtain polyolefins. The need remains, however, for a polymerization catalyst for polymerization of olefins which has good activity toward the polymerization reaction, while providing a final product with a desirable melt flow index and bulk density, and further while reducing the content of fines therein.

It is therefore the primary object of the present invention to provide a polymerization catalyst for polymerization of olefins which has enhanced activity toward the polymerization reaction so as to provide enhanced yield of polyolefin product with a desirable bulk density.

It is a further object of the present invention to provide an olefin polymerization catalyst wherein the polyolefin product has a reduced content of fines.

It is a further object of the present invention to provide an additive for an olefin polymerization catalyst which enhances the characteristics of the catalyst for polymerization of olefins.

Other objects and advantages of the present invention will appear hereinbelow.

SUMMARY OF THE INVENTION

In accordance with the present invention, the foregoing objects and advantages are readily attained. In accordance with the invention, an olefin polymerization catalyst is provided which comprises a halogen-containing magnesium compound; a titanium compound; and an additive selected from the group consisting of (a) a mixture of an aluminum alkoxide compound and polydimethylsiloxane, (b) an aluminosiloxane, (c) the reaction product of an aluminum alkyl and calixarene, (d) the reaction product of an aluminum alkyl and cyclodextrin and mixtures of (a)–(d).

BRIEF DESCRIPTION OF THE DRAWINGS

A detailed description of preferred embodiments of the invention follows, with reference to the attached drawings, wherein.

DETAILED DESCRIPTION

Figure 1:
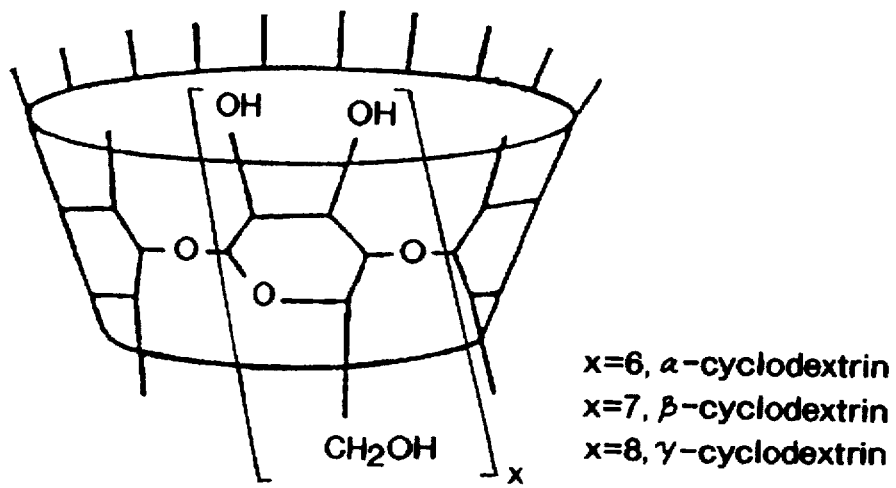
FIG. 1 illustrates a cyclodextrin additive component for use in accordance with an embodiment of the invention.

The invention relates to an olefin polymerization catalyst, especially to a catalyst for polymerization of olefins such as ethylene into polyolefins such as polyethylene.

The present polymerization catalyst is based upon Ziegler-Natta catalysts typically comprising a magnesium halide support and a titanium compound supported on the magnesium halide support. In accordance with the present invention, a series of additives have been developed which, when incorporated into the polymerization catalyst, provide enhanced activity and characteristics of the catalyst toward the polymerization reaction. In accordance with the invention, it has been found to be advantageous to incorporate an additive selected from the group consisting of (a) a mixture of an aluminum alkoxide compound and polydimethylsiloxane, (b) an aluminosiloxane, (c) the reaction product of an aluminum alkyl and calixarene, (d) the reaction product of an aluminum alkyl and cyclodextrin, and mixtures thereof so as to provide the olefin polymerization catalyst according to the present invention. A catalyst containing such an additive according to the present invention has been found to have excellent activity toward the polymerization reaction so as to provide an enhanced yield of polyolefin having desirable qualities, while using a relatively small amount of titanium, and further while providing a catalyst which results in a reduced amount of fines in the resulting polyolefin product.

In accordance with the invention, the halogen containing magnesium compound may suitably be magnesium chloride, while the titanium compound may suitably be titanium chloride, especially titanium tetrachloride.

As set forth above, the series of additives which has been found in accordance with the invention to provide desirable characteristics in a polymerization catalyst includes an additive selected from the group consisting of (a) a mixture of an aluminum alkoxide compound and polydimethylsiloxane, (b) an aluminosiloxane, (c) the reaction product of an aluminum alkyl and calixarene, (d) the reaction product of an aluminum alkyl and cyclodextrin, and -mixtures thereof.

One additive in accordance with the present invention, as set forth above, may suitably be a mixture of aluminum compound and polydimethylsiloxane. An aluminum alkoxide compound as used herein refers to an organic compound having the functionality

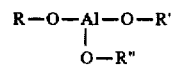

wherein R, R' and R" are the same or different hydrocarbyl radicals of not more than 12 carbon atoms, such as methyl, ethyl, isopropyl and the like. Examples of particularly desirable aluminum alkoxide compounds for combination with polydimethylsiloxane in accordance with the invention include aluminum methoxide, aluminum ethoxide, aluminum isopropoxide and mixtures thereof.

In accordance with the present invention, when the additive is to be a mixture of aluminum alkoxide and polydimethylsiloxane, the polydimethylsiloxane preferably has a molecular weight of between about 150 and about 300,000, more preferably between about 150 and about 770. Relatively low molecular weight polydimethylsiloxane has been found in accordance with the invention to provide a catalyst having a better catalyst activity than those produced with higher molecular weight polydimethylsiloxane.

As set forth above, preferred additives for the catalyst in accordance with the present invention include calixarene and/or cyclodextrin compounds.

Referring to FIG. 1, a cyclodextrin compound is illustrated which is suitable in accordance with the present invention for reaction with an aluminum alkyl, and the reaction product thereof is suitable for incorporation as an additive into an olefin polymerization catalyst so as to provide enhanced characteristics with respect to the desired process. Examples of suitable cyclodextrin compounds include α-cyclodextrin, β-cyclodextrin, γ-cyclodextrin and mixtures thereof.

Figure 2:
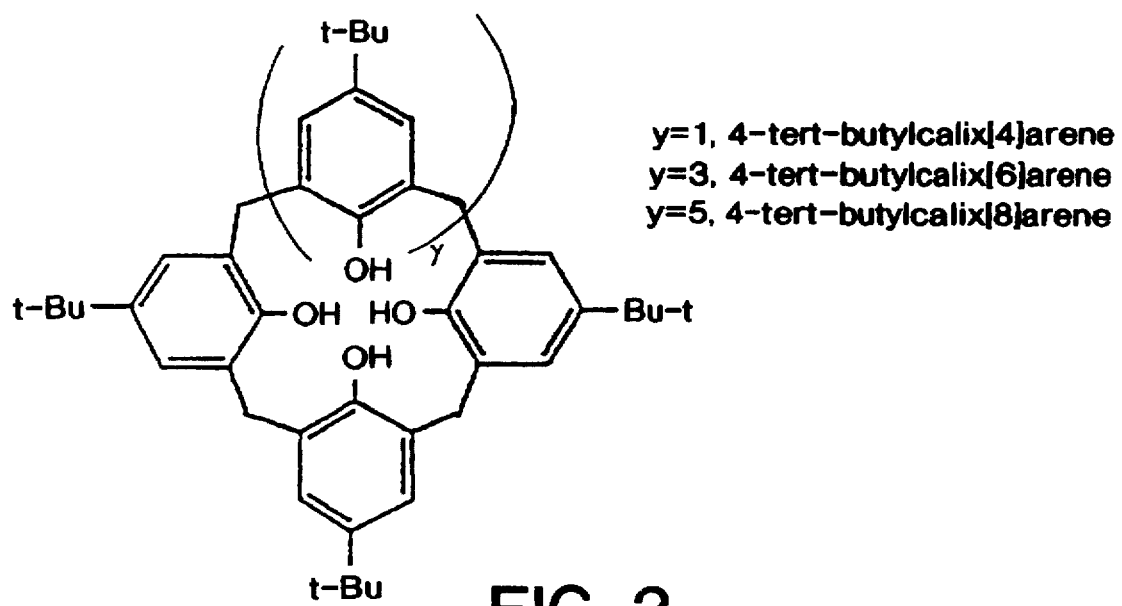
FIG. 2 illustrates a calixarene additive component according to a further embodiment of the invention.

Referring to FIG. 2, an example of a calixarene compound which upon reaction with an aluminum alkyl, the reaction product thereof is suitable as an additive in accordance with the present invention is shown. Calixarene compounds have been found in accordance with the present invention to enhance the activity of a polymerization catalyst for the polymerization of olefin when the reaction product between a calixarene and an aluminum alkyl is added as an additive. Examples of suitable calixarene compounds include calix[4]arene, calix[6]arene, calix[8]arene, 4-tert-butylcalix[4]arene, 4-tert-butylcalix[6]arene, 4-tert-butylcalix[8]arene and mixtures thereof.

Specific examples of suitable aluminum alkyl compounds include trimethylaluminum, triethylaluminum, tri-i-butylaluminum and mixtures thereof.

In further accordance with the invention, aluminosiloxane compounds have also been found to be particularly desirably additives to the catalyst in accordance with the present invention. The aluminosiloxane compound in accordance with the present invention is preferably selected from the group consisting of $[Al(OR')_2 (OSiR''_3)]_m$, $[Al(OR') (OSiR''_3)_2]_p$, and $[Al(OSiR''_3)_3]_2$, wherein R' and R" are alkyl or aryl groups, preferably having up to about 12 carbons and m and p are any whole number greater than 1. R' may preferably be selected from the group consisting of ethyl, propyl, isopropyl, n-butyl, isobutyl, t-butyl and mixtures thereof, while R" is selected from the group consisting of methyl, phenyl, ethyl, propyl, isopropyl, t-butyl and mixtures thereof. The organo aluminosiloxy compound according to the invention has a ratio of Al:Si which is preferably 1:1, 1:2, or 1:3.

Figure 3:
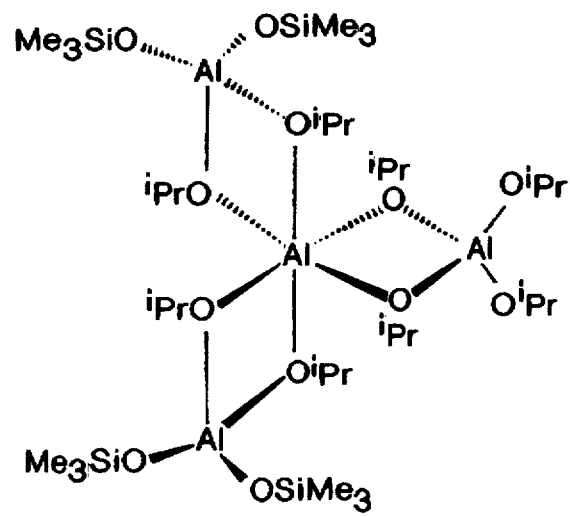
FIGS. 3–7 illustrate alternative embodiments of aluminosiloxane additives according to the present invention.
Figure 4:
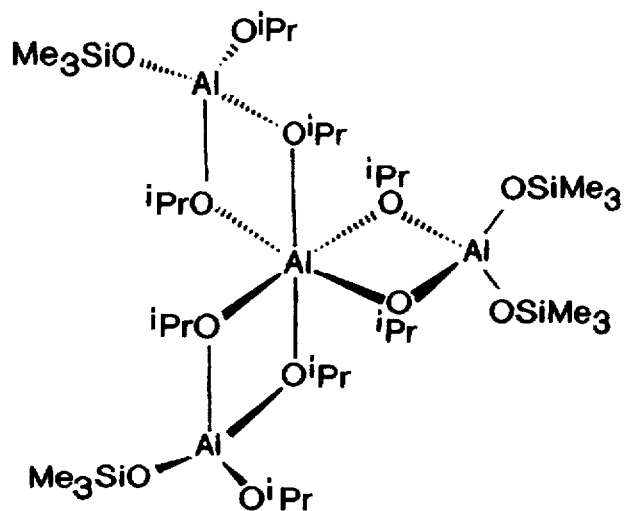

As set forth above, one preferable form of the organo aluminosiloxy compound is $[Al(OR')_2 (OSiR''_3)]_m$. Two examples of this compound are shown in the drawings in FIGS. 3 and 4. In the example illustrated in FIGS. 3 and 4, R' is isopropyl, R" is methyl, and the ratio of Al:Si is 1:1.

Figure 5:
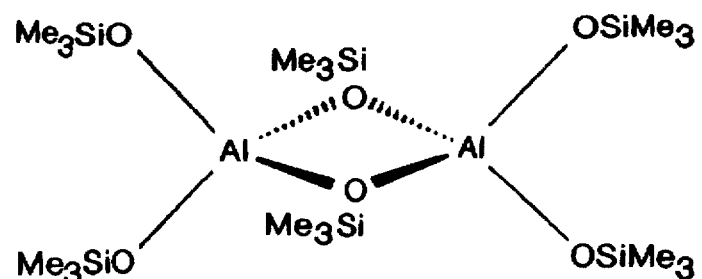

Referring to FIG. 5, another preferred organo aluminosiloxy compound is shown which corresponds to $[Al(OSiR''_3)_3]_2$, as set forth above. As shown in FIG. 5, R" in this compound is methyl, and the ratio Al:Si is 1:3.

Figure 6:
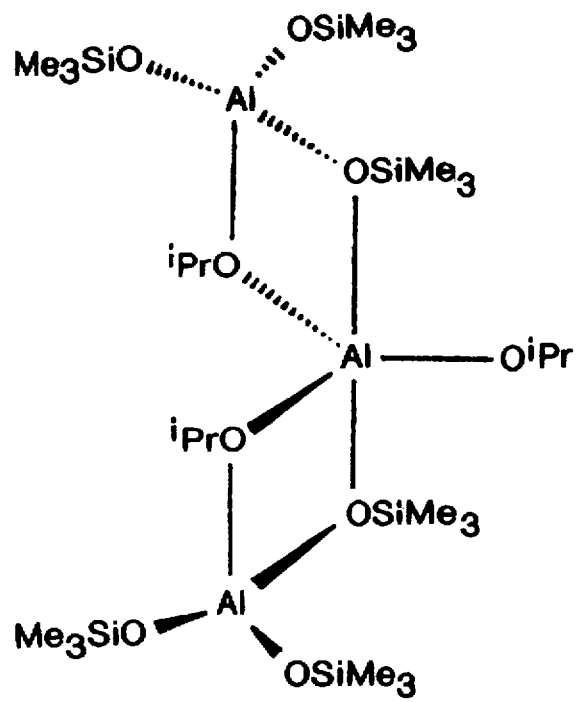
Figure 7:
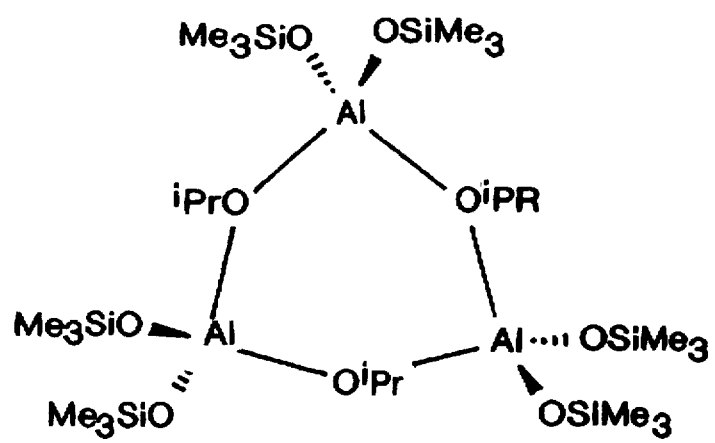

Referring to FIGS. 6 and 7, a further embodiment of an organo aluminosiloxy compound additive in accordance with the present invention is shown. In accordance with the illustrated embodiment, compounds are illustrated having the formula $[Al(OR')(OSiR''_3)_2]_p$. In the embodiment shown in FIGS. 6 and 7, R' is isopropyl, while R" is methyl, and the ratio Al:Si is 1:2.

The olefin polymerization catalyst of the present invention preferably has a substantially monomodal and narrow particle size distribution which preferably has an average particle size of between about 2 microns to about 200 microns. Further, the catalyst preferably has an Al/Si molar ratio of between about 0.1 to about 300, more preferably between about 0.33 to about 1 (Al:Si between 1:1 to 1:3), especially when the additive is an aluminosiloxane compound.

Further, the catalyst according to the present invention preferably has a molar ratio Ti/Al of between about 10 to about 100, and a molar ratio Mg/Al of between about 10 to about 600.

In accordance with the invention, the additive of the present invention may suitably be added to the catalyst ingredients during synthesis of same. Alternatively, the additive of the present invention may suitably be incorporated into the catalyst composition, before or during olefin polymerization.

In accordance with the invention, the desired additive may be prepared through numerous different methods.

In connection with the aluminosiloxane compound additive, the preparation thereof may be accomplished according to K. Folting, W. E. Streib, K. G. Caulton, O. Poncelet and L. G. Hubert-Pfalzgraf, *Polyhedron*, 10 (14), 1639–1646 (1991). A mixture of trimethylsilylacetate and cyclohexane may be added to aluminum isopropoxide in the desired ratio so as to provide the desired relation of Si:Al of 1:1, 2:1 or 3:1. The mixtures so formed are then subjected to azeotropic distillation so as to obtain cyclohexane/isopropylacetate, and the solution can then be concentrated and distilled so as to provide the desired additive. Azeotropic distillation may be carried out at a temperature of approximately 80° C. and for a time period of between about 8 to about 24 hours. Of course, the time and temperature of the procedure may be adjusted to particular conditions and ingredients. The resulting additive product may suitably be identified and confirmed to possess the desired structure through IR and $^1$H NMR spectroscopies.

An aluminosiloxane compound $[Al (O^iPr)_2 (OSiMe_3)]_m$ according to the invention has spectroscopic information as follows:

IR(cm$^{-1}$): 1250(Si—C); 1180, 1130 (C—CH$_3$); 1070; 950 (Si—O); 760; 640 (Al—OR).

$^1$H NMR (CDCl$_3$; 0.1M, 25° C.) (ppm): 4.47–4.08 (m, OCHMe$_2$, 2H), 1.42; 1.27; 1.47; 1.36; 1.21; 1.10; 1.06 (d, J=6Hz, OCHMe$_2$, 12H); 0.25, 0.22, 0.21 (s, OSiMe$_3$, 9H).

Alternatively, for example when the additive is to be a calixarene or cyclodextrin compound, a solution of trimethylaluminum in toluene may be added to a suspension of a calixarene or cyclodextrin reactant and anhydrous toluene, preferably while stirring in a cold bath for a sufficient period of time, such as approximately 2 hours. The temperature of the mixture is then increased or allowed to reach room temperature, and additional stirring is carried out. A solid is eventually obtained, after evaporation of solvent under a vacuum, and the resulting calixarene or cyclodextrin additive compound can be characterized by IR and/or NMR spectroscopies. Such an additive will typically exhibit spectroscopies as follows:

IR(cm$^{-1}$): 2900–2850, 1510, 1380, 1290 (C—H); 600 (Al—OR).

$^1$H NMR (CDCl$_3$; 0.1M, 25° C.) (ppm): 7.0 (m, H, Ar); 3.3 (m, Ar—CH$_2$—Ar); 1.0 (m, CMe$_3$); −1.1 (M, Al—Me).

While the foregoing provide examples for preparation of additive in accordance with the present invention, it should of course be noted that other processes for preparation of the desired additive may be known to those of ordinary skill in the art and could, of course, be used to prepare the additive of the catalyst of the present invention.

In further accordance with the invention, a catalyst can be prepared through a synthesis method wherein a mixture of a halogen-containing magnesium compound such as magnesium chloride, a $C_4$–$C_{12}$ aliphatic or aromatic solvent such as decane, a $C_6$–$C_{12}$ aliphatic or aromatic alcohol such as 2-ethylhexanol and the desired additive is formed. The mixture is preferably charged into a reactor vessel under an inert gas atmosphere, and reacted at an elevated temperature such as approximately 110°–140° C. for a period of time of approximately 1–4 hours, preferably under stirring. The reaction mixture may then in accordance with the present invention be cooled, preferably to between about 0° C. to about −20° C., and a volume of titanium halide such as titanium tetrachloride is slowly added. An additional charge of the desired additive is then added to the mixture, and the mixture is continuously stirred for an additional time period. The mixture is then heated again to an elevated temperature between 60°–100° C., for a period of time of 1 to 3 hours, cooled to room temperature and then allowed to settle, and is separated by filtration.

The separated solid is then preferably suspended in a solution of titanium tetrachloride, heated for another period of time, and resulting solid is again separated for example by filtration. The solid so obtained is then purified, for example by repeated washing with hot hexane, and is then dried under vacuum or inert gas stream. The resulting catalyst is in powder form and preferably has a titanium content of between about 3 to about 12 wt. %, and an average particle size of between about 4 to about 100 microns.

In accordance with the present invention, the above-described process for synthesis has been found to provide catalyst having improved activity. Nevertheless, other methods are of course known in the art for the synthesis of such catalysts, and the catalyst of the present invention could be prepared by such known methods.

The olefin polymerization catalyst of the present invention can suitably be used for olefin polymerization reactions so as to produce polyolefins such as polyethylene, including any related polymers and the like.

A polymerization reactor may suitably be subjected to evacuation-argon substitution, and then charged with dehydrated and oxygen-removed hexane as well as triethylaluminum and hydrogen so as to prepare the reactor. The reactor may then be saturated with olefins such as ethylene at a working pressure and temperature, for example 8 bar and 80° C., and the catalyst according to the present invention may then be charged into the reactor. After a suitable amount of time, such as, for example, 2 hours, the resulting polymer slurry can be filtered, and a yield of polyolefin such as polyethylene is produced. In accordance with the invention, the polyolefin product preferably has a melt flow index of between about 0.01 to about 200, and a bulk density of between about 0.25 to about 0.40. Further, the polymerization according to the present invention using the catalyst of the present invention preferably results in the final polyolefin product having a fines content of less than or equal to about 15% of particles having a diameter of less than or equal to about 106 microns.

Methods for preparing the additive of the present invention, for preparing the catalyst of the present invention including such additive, and for using the catalyst of the present invention in polymerization reactions have been discussed above. It should of course be noted that numerous alternatives to these methods could be carried out by a person of ordinary skill in the art so as to prepare and/or use the catalyst within the scope of the present invention.

The following examples further illustrate preparation of additive and catalyst and polymerization in accordance with the invention.

EXAMPLE 1

The preparation of an aluminosiloxane additive of the formula $[Al(O^iPr)_2OSiMe_3]_m$ was carried out in accordance with the aforementioned reference by K. Folting et al., wherein $^iPr$ is isopropyl and Me is methyl. A solution of trimethylsilyl acetate (3.165 g, 0.024 mol) in 0.65 ml of cyclohexane was added to aluminum triisopropoxide (4.93 g, 0.024 mol) over a period of two hours at a temperature of 80° C. whereby azeotropic distillation of cyclohexane/isopropyl acetate was achieved. The solution so obtained was then concentrated and distilled at 80° C. and 0.01 mm Hg so as to provide additive A, the composition of which was confirmed by IR and $^1H$ NMR spectroscopies. Two additional additives were also prepared following the same procedures, but altering the Al:Si ratio so as to provide two additional additives: $[Al(O^iPr)(OSiMe_3)_2]_p$ (Additive B); and $[Al(OSiMe_3)_3]_2$ (Additive C).

The preparation of a catalyst in accordance with the invention using additive A as prepared above was then carried out. 12.00 g of anhydrous magnesium chloride, 100 ml of decane, 60 ml of 2-ethyl hexanol and 0.25 g of Additive A were charged under an inert gas atmosphere into a reactor vessel and reacted at 120° C. for 2 hours. The reaction mixture was cooled to −20° C. and then 200 ml of titanium tetrachloride were slowly added. The mixture was stirred for an additional period of 30 minutes, and the temperature of the mixture was then increased to room temperature with occasional stirring and another 0.125 g of additive A were added, after which the mixture was stirred for an additional 30 minutes.

The mixture was heated to 90° C. for 2 hours and the resulting solid was allowed to settle, was separated by filtration, suspended in 60 ml of titanium tetrachloride and heated at 80° C. for 2 hours. The solid was separated by filtration, repeatedly washed with a total volume of hot hexane of about 1000 ml and finally dried under vacuum. The resulting yellow powder showed a titanium content of 8.2% and an average particle size of 14 microns.

EXAMPLE 2

This example illustrates a polymerization reaction using the catalyst according to the present invention as prepared above in Example 1. A stainless steel autoclave having a stirrer, a temperature controlling device and a 2 liter capacity was provided. The reactor was subjected to evacuation-argon substitution several times and was charged with 1 liter of dehydrated and oxygen-removed hexane, 1.68 mmol of triethyl aluminum and 3 bar of hydrogen. The reactor was saturated with ethylene at the working pressure of 8 bar and at 80° C., and approximately 10 mg of the catalyst of Example 1 containing additive A were charged into the reactor. Polymerization was carried out for 2 hours, at which time the resulting polymer slurry was filtered. The process yielded 340 g of polyethylene having a melt flow index of 0.5 g/10 min and a bulk density of 0.25 g/ml. The product had a content of 1.7% of fines having a diameter of less than 106 microns.

EXAMPLE 3

This example illustrates polymerization carried out according to the invention using a catalyst prepared according to the process of Example 1 using 0.725 g of additive B instead of the 0.125 g of additive A. The resulting catalyst was a yellow powder having a titanium content of 7.7 wt. % and an average particle size of 11.1 microns.

Ethylene was polymerized according to the same procedure set forth in Example 2, using the catalyst including additive B, and the polyethylene yield was 346 g having a melt flow index of 0.57 g/10 min and a bulk density of 0.25 g/ml. The final product contained 2.63% fines having a diameter of less than 106 microns.

EXAMPLE 4

This example illustrates the preparation of a calixarene additive (Additive D), as well as the preparation and use of a catalyst including this additive.

A solution of trimethylaluminum (3.7 ml, 0.038 mol) in 30 ml of toluene was added dropwise to a suspension of 500 mg of 4-tert-butylcalix[8]arene in 30 ml of anhydrous toluene. The reaction was conducted with magnetic stirring in a cold bath at −76° C. Upon completion of the alkyl solution addition, the reaction mixture was allowed to reach room temperature and further stirred for 1 hour. Evolution of gas was observed during the process. A white solid was obtained after evaporation of the solvent under vacuum. The resulting additive product was characterized by IR and NMR spectroscopies as follows: IR: (cm$^{-1}$) 2900–2850, 1510, 1380, 1290 (C—H); 600 (Al—Or).

$^1$H NMR (CDCl$_3$; 0.1M, 25° C.) (ppm): 7.0 (m, H, Ar); 3.3 (m, Ar—CH$_2$—Ar); 1.0 (m, CMe$_3$); −1.1 (m, Al—Me).

EXAMPLE 5

A catalyst was prepared similarly to that of Example 1 above, adding 6.00 g of anhydrous magnesium chloride, 50 ml of decane, 30 ml of 2-ethylhexanol and 1.00 g of additive D, (as prepared in Example 4) and charging the mixture into a reactor vessel under inert gas conditions. The mixture reacted vigorously with gas evolution at room temperature. After this, the reactor was heated to 150° C. for 3 hours. The resulting solution was cooled to −20° C. and then 100 ml of titanium tetrachloride were slowly added for a period of 1.5 hours. This solution was allowed to reach room temperature and a further 0.70 g of additive D suspended in 20 ml of decane were added. The mixture was heated at 90° C. for 2 hours, the supernatant liquid was discarded, and the solid was treated with 30 ml of titanium tetrachloride and heated to 80° C. for 2 hours. The solid was collected by filtration, repeatedly washed with hot hexane using a total volume of about 600 ml, and dried under a vacuum. The resulting reddish-brown powder showed a titanium content of 7.7% and an average particle size of 18 microns.

The catalyst prepared as above was then used in a polymerization reaction under the same conditions as set forth above in Example 2. After 1 hour of polymerization, the yield of polyethylene was 182 g with a melt flow index of 0.76 g/10 min and a bulk density of 0.27 g/ml. The final product contained 12.8% fines having a diameter of less than 106 microns.

EXAMPLE 6

This example illustrates the preparation of a cyclodextrin additive (Additive E), as well as the preparation and use of a catalyst including this additive.

A solution of trimethylaluminum (1.5 ml, 0.016 mol) in 30 ml of toluene was added dropwise to a suspension of 1.00 g of β-cyclodextrin (which had been previously dried by heating under vacuum) in 40 ml of anhydrous toluene. The reaction was conducted with magnetic stirring in a cold bath at −76° C. Upon completion of the alkyl solution addition, the reaction mixture was allowed to reach room temperature and further stirred for 48 hours. A white solid was obtained after evaporating the solvent under vacuum. The resulting product (additive E) was characterized by IR, $^1$H NMR and $^{13}$C NMR spectroscopies as follows:

IR (cm$^{-1}$): 2900–2850, 1510 (C—H); 1120–980 (C—O); 770–600 (—OR) (Al—OR).

$^1$H NMR (CDCl$_3$; 0.1M, 25° C.) (ppm): 3.5(s, H, O—CH—O); −0.8 (s, Al—Me).

A catalyst was then prepared following a similar process to that discussed in Example 1. 6.00 g of anhydrous magnesium chloride, 50 ml of decane, 30 ml of 2-ethylhexanol and 1.225 g of additive E, as prepared above, were charged under inert gas conditions into a reactor vessel. The mixture reacted vigorously with gas evolution at room temperature. After this, the reactor was heated at 150° C. for 3 hours. The resulting solution was cooled to −20° C. and then 100 ml of titanium tetrachloride were slowly added for a period of 1.5 hours. This solution was allowed to reach room temperature and a further 1.225 g of additive E, suspended in 20 ml of decane, were added. The mixture was heated at 90° C. for 2 hours, then the supernatant liquid was discarded while the solid portion was treated with 30 ml of titanium tetrachloride and heated at 80° C. for 2 hours. The solid was collected by filtration, repeatedly washed (total volume of hot hexane used for washing=600 ml), and dried under vacuum. The resulting yellow powder contained 8.0% by weight of titanium and had an average particle size of 8.4 microns.

The catalyst prepared above was then used in a polymerization reaction as follows. Ethylene was polymerized under the same conditions as in Example 2 using the catalyst component above described. After 2 hours of polymerization, the yield of polyethylene was 154 g with a melt flow index of 1.27 g/10 min and a bulk density of 0.29 g/ml. The final product contained 0.3% of fines having a diameter of less than 106 microns.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An olefin polymerization catalyst, comprising:
    a halogen-containing magnesium compound;
    a titanium compound; and
    an additive selected from the group consisting of
    (a) a mixture of an aluminum tri-alkoxide compound and polydimethylsiloxane,
    (b) an aluminosiloxane selected from the group consisting of [Al(OR')$_2$(OSiR"$_3$)]$_m$, [Al(OR')(OSiR"$_3$)$_2$]$_p$, and [Al(OSiR"$_3$)$_3$]$_2$, wherein R' and R" are alkyl or aryl groups having up to 12 carbons and $_m$ and $_p$ are any whole number greater than 1,
    (c) the reaction product of an aluminum alkyl and a calixarene,
    (d) the reaction product of an aluminum alkyl and a cyclodextrin, and mixtures of (a)–(d).

2. A catalyst according to claim 1, wherein said catalyst has a substantially monomodal particle size distribution having an average particle size of between about 2 microns and about 200 microns.

3. A catalyst according to claim 1, wherein said magnesium halide comprises MgCl$_2$ and wherein said titanium compound comprises TiCl$_4$.

4. A catalyst according to claim 1, wherein said additive contains aluminum and silicon and has an Al/Si molar ratio of between about 0.33 and about 1.

5. A catalyst according to claim 4, wherein said additive has an Al/Si molar ratio of between about 0.33 and about 1.

6. A catalyst according to claim 1, wherein said catalyst has a Ti/Al molar ratio of between about 10 and about 100.

7. A catalyst according to claim 1, wherein said catalyst has an Mg/Al molar ratio of between about 10 and about 600.

8. A catalyst according to claim 1, wherein said additive comprises a mixture of said aluminum tri-alkoxide compound and said polydimethylsiloxane, and wherein said polydimethylsiloxane has a molecular weight of between about 150 and about 300,000.

9. A catalyst according to claim 8, wherein said aluminum tri-alkoxide compound is an organic compound having the functionality

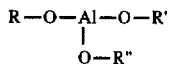

wherein R, R' and R" are hydrocarbyl radicals of not more than 12 carbon atoms.

10. A catalyst according to claim 8, wherein said aluminum tri-alkoxide compound is selected from the group consisting of aluminum methoxide, aluminum ethoxide, aluminum isopropoxide and mixtures thereof.

11. A catalyst according to claim 8, wherein said polydimethylsiloxane has a molecular weight of between about 150 and about 770.

12. A catalyst according to claim 1, wherein said additive is selected from the group consisting of (c) the reaction product of an aluminum alkyl and a calixarene, (d) the reaction product of an aluminum alkyl and a cyclodextrin, and mixtures of (c) and (d).

13. A catalyst according to claim 12, wherein said additive results from reaction of a calixarene selected from the group consisting of 4-tert-butylcalix[4]arene, 4-tert-butylcalix[6]arene, 4-tert-butylcalix[8]arene, and mixtures thereof.

14. A catalyst according to claim 12, wherein said additive results from reaction of a cyclodextrin selected from the group consisting of α-cyclodextrin, β-cyclodextrin, γ-cyclodextrin, and mixtures thereof.

15. A catalyst according to claim 1, wherein said additive comprises an aluminosiloxane compound.

16. A catalyst according to claim 15, wherein said aluminosiloxane compound is selected from the group consisting of $[Al(O^iPr)_2 (OSiMe_3)]_m$, $[Al(O^iPr) (OSiMe_3)_2]_p$, $[Al(OSiMe_3)_3]_2$, and mixtures thereof, wherein $m$ and $p$ are any whole number greater than 1.

17. A catalyst according to claim 1, wherein R' is selected from the group consisting of ethyl, propyl, isopropyl, n-butyl, isobutyl, t-butyl and mixtures thereof, and wherein R" is selected from the group consisting of methyl, phenyl, ethyl, propyl, isopropyl, t-butyl and mixtures thereof.

* * * * *